US012592632B2

(12) United States Patent　(10) Patent No.:　US 12,592,632 B2
Hsieh et al.　(45) Date of Patent:　Mar. 31, 2026

(54) POWER CONVERTER HAVING MULTI-MODE SWITCHING MECHANISM

(71) Applicant: ANPEC ELECTRONICS CORPORATION, Hsinchu (TW)

(72) Inventors: Jen-Chien Hsieh, Hsinchu City (TW); Tsung-Yu Wu, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 245 days.

(21) Appl. No.: 18/230,667

(22) Filed: Aug. 7, 2023

(65) Prior Publication Data

US 2024/0356428 A1　Oct. 24, 2024

(30) Foreign Application Priority Data

Apr. 21, 2023　(TW) ................................. 112114893

(51) Int. Cl.
*H02M 1/088*　(2006.01)
*H02M 7/217*　(2006.01)

(52) U.S. Cl.
CPC ........... *H02M 1/088* (2013.01); *H02M 7/217* (2013.01)

(58) Field of Classification Search
None
See application file for complete search history.

(56) References Cited

U.S. PATENT DOCUMENTS

| | | | | |
|---|---|---|---|---|
| 10,014,778 | B1 * | 7/2018 | Wei ..................... | H02M 3/1582 |
| 2004/0067740 | A1 * | 4/2004 | Handa ................... | H02M 3/155 |
| | | | | 429/231.95 |

| | | | | |
|---|---|---|---|---|
| 2008/0315850 | A1 * | 12/2008 | Nishida ................. | H02M 3/157 |
| | | | | 323/284 |
| 2009/0295343 | A1 * | 12/2009 | Chiu .................... | H02M 3/1582 |
| | | | | 323/234 |
| 2010/0231189 | A1 * | 9/2010 | Chen .................... | H02M 3/1582 |
| | | | | 323/284 |
| 2014/0143560 | A1 * | 5/2014 | Kwon ................... | G09G 3/2092 |
| | | | | 713/300 |
| 2014/0217996 | A1 * | 8/2014 | Peker .................. | H02M 3/1582 |
| | | | | 323/271 |
| 2015/0092451 | A1 * | 4/2015 | Popovici ................ | H02M 3/28 |
| | | | | 363/17 |
| 2020/0350817 | A1 * | 11/2020 | De ........................ | H02M 3/155 |

(Continued)

FOREIGN PATENT DOCUMENTS

| | | |
|---|---|---|
| TW | 200843308 A | 11/2008 |

*Primary Examiner* — Alexander H Taningco

(74) *Attorney, Agent, or Firm* — Li & Cai Intellectual Property Office

(57) ABSTRACT

A power converter having a multi-mode switching mechanism is provided. The power converter includes a first switch, a second switch, a low-side switch, an output calculating circuit and a control circuit. A first terminal of the first switch is connected to a first terminal of an inductor. A second terminal of the inductor is connected to an input power source. A first terminal of the second switch is connected to a second terminal of the first switch. A second terminal of the second switch is connected to the output calculating circuit. A first terminal of the low-side switch is connected to the first terminal of the first switch. A control circuit is connected to a control terminal of the first switch, a control terminal of the second switch, a control terminal of the low-side switch and the output calculating circuit.

10 Claims, 9 Drawing Sheets

(56)                    References Cited

U.S. PATENT DOCUMENTS

| | | | |
|---|---|---|---|
| 2022/0103072 A1* | 3/2022 | Lee ..................... | H02M 1/0032 |
| 2022/0416666 A1* | 12/2022 | Kawano .............. | H02M 3/1588 |
| 2023/0116750 A1* | 4/2023 | Saccomanno ......... | H02M 3/158 |
| | | | 323/222 |
| 2024/0385670 A1* | 11/2024 | Chen ..................... | G06F 1/3203 |

* cited by examiner

POWER CONVERTER HAVING MULTI-MODE SWITCHING MECHANISM

CROSS-REFERENCE TO RELATED PATENT APPLICATION

This application claims the benefit of priority to Taiwan Patent Application No. 112114893, filed on Apr. 21, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a multi-mode switching mechanism.

BACKGROUND OF THE DISCLOSURE

Power converters are indispensable for electronic devices. The power converters are used to adjust power and supply the adjusted power to the electronic devices. The power converters include high-side switches and low-side switches. The high-side switches and the low-side switches of the power converters must be switched according to data such as voltages and currents of circuit components of the power converters, so that the power converters can supply appropriate power to the electronic devices. However, conventional control circuits cannot switch the power converters between different modes.

SUMMARY OF THE DISCLOSURE

In response to the above-referenced technical inadequacies, the present disclosure provides a power converter having a multi-mode switching mechanism. The power converter includes a switch circuit, an output calculating circuit and a control circuit. The switch circuit includes a first switch, a second switch and a low-side switch. A first terminal of the first switch is connected to a first terminal of an inductor. A second terminal of the inductor is connected to an input power source. A first terminal of the second switch is connected to a second terminal of the first switch. A second terminal of the second switch is connected to a first terminal of a capacitor. A second terminal of the capacitor is grounded. A node between the first terminal of the second switch and the second terminal of the first switch is used as an output terminal of the power converter. A first terminal of the low-side switch is connected to the first terminal of the first switch. A second terminal of the low-side switch is grounded. An output calculating circuit is connected to the output terminal of the power converter. The output calculating circuit is configured to receive an output voltage of the power converter from the output terminal of the power converter. The output calculating circuit is configured to calculate differences between the output voltage of the power converter and a plurality of reference voltages to output a plurality of feedback calculated signals. The control circuit is connected to the input power source, a control terminal of the first switch, a control terminal of the second switch, a control terminal of the low-side switch and an output terminal of the output calculating circuit. The control circuit is configured to switch the switch circuit according to the plurality of feedback calculated signals and an input voltage from the input power source such that the power converter is switched between a plurality of modes.

In certain embodiments, the power converter further includes an output divider circuit. The output divider circuit is connected to the output terminal of the power converter and an input terminal of the output calculating circuit. The output divider circuit divides the output voltage of the power converter to output a plurality of feedback divided voltages. The output calculating circuit outputs the plurality of feedback calculated signals according to the plurality of feedback divided voltages and the plurality of reference voltages.

In certain embodiments, the output calculating circuit includes a plurality of output amplifiers. First input terminals of the plurality of output amplifiers are connected to the output divider circuit. The first input terminals of the plurality of output amplifiers are configured to respectively receive the plurality of feedback divided voltages from the output divider circuit. Second input terminals of the plurality of output amplifiers are coupled to the plurality of reference voltages respectively.

In certain embodiments, the plurality of reference voltages include a first reference voltage and a second reference voltage. The plurality of output amplifiers of the output calculating circuit include a first output amplifier and a second output amplifier. A first input terminal of the first output amplifier is connected to the output divider circuit and configured to receive one of the plurality of feedback divided voltages from the output divider circuit. A second input terminal of the first output amplifier is coupled to the first reference voltage. A first input terminal of the second output amplifier is connected to the output divider circuit, and configured to receive another of the plurality of feedback divided voltages from the output divider circuit. A second input terminal of the second output amplifier is coupled to the second reference voltage.

In certain embodiments, the control circuit includes an input calculating circuit. The input calculating circuit is coupled to a plurality of first power divided voltages that are divided from the input voltage respectively by different ratios. The input calculating circuit is configured to output an input calculation logic signal according to a difference between each of the plurality of first power divided voltages and a reference voltage coupled to the input calculating circuit.

In certain embodiments, the input calculating circuit is coupled to a plurality of second power divided voltages that are divided from the input voltage respectively by different ratios. The input calculating circuit is configured to output a power feedback calculated signal according to a difference between each of the plurality of second power divided voltages and a feedback divided voltage that is a voltage divided from the output voltage of the power converter.

In certain embodiments, the control circuit further includes a first switch component and a second switch component. A first terminal of the first switch component is connected to the output calculating circuit. The first terminal of the first switch component is configured to receive each of the plurality of feedback calculated signals from the output calculating circuit. A second terminal of the first switch component is connected to the control terminal of the second switch. A first terminal of the second switch component is connected to an external mode switching circuit. The first terminal of the second switch component is configured to receive a mode switching control signal from the external mode switching circuit. A second terminal of the second switch component is connected to the control terminal of the second switch. A control terminal of the first switch component and a control terminal of the second switch component are connected to an output terminal of the input calculating circuit.

In certain embodiments, the input calculating circuit includes a first input amplifier, a second input amplifier and a logic circuit. A first input terminal of the first input amplifier is coupled to each of the plurality of first power divided voltages. A second input terminal of the first input amplifier is coupled to the reference voltage. A first input terminal of the second input amplifier is coupled to each of the plurality of second power divided voltages. A second input terminal of the second input amplifier is coupled to the feedback divided voltage that is divided from the output voltage of the power converter. The logic circuit is connected to an output terminal of the first input amplifier, an output terminal of the second input amplifier, the control terminal of the first switch component and the control terminal of the second switch component. The logic circuit outputs an input calculation logic signal to the control terminal of the first switch component and the control terminal of the second switch component, according to levels of the input calculation logic signal from the first input amplifier and levels of the power feedback calculated signal from the second input amplifier.

In certain embodiments, the plurality of first power divided voltages include a first high-side power voltage and a first low-side power voltage. The control circuit further includes a first switching component and a second switching component. A first terminal of the first switching component is coupled to the first high-side power voltage. A second terminal of the first switching component is connected to the first input terminal of the first input amplifier. A control terminal of the first switching component is connected to the output terminal of the first input amplifier. A first terminal of the second switching component is coupled to the first low-side power voltage. A second terminal of the second switching component is connected to the first input terminal of the first input amplifier. A control terminal of the second switching component is connected to the output terminal of the first input amplifier.

In certain embodiments, the plurality of second power divided voltages include a second high-side power voltage and a second low-side power voltage. The control circuit further includes a third switching component and a fourth switching component. A first terminal of the third switching component is coupled to the second high-side power voltage. A second terminal of the third switching component is connected to the first input terminal of the second input amplifier. A control terminal of the third switching component is connected to the output terminal of the second input amplifier. A first terminal of the fourth switching component is coupled to the second low-side power voltage. A second terminal of the fourth switching component is connected to the first input terminal of the second input amplifier. A control terminal of the fourth switching component is connected to the output terminal of the second input amplifier.

In certain embodiments, the logic circuit further includes a NOR gate and an OR gate. A first input terminal of the NOR gate is connected to the output terminal of the first input amplifier. A second input terminal of the NOR gate is connected to the output terminal of the second input amplifier. A first input terminal of the OR gate is connected to an output terminal of the NOR gate. A second input terminal of the OR gate is connected to the external mode switching circuit. The second input terminal of the OR gate is configured to receive an output switching instruction signal from the external mode switching circuit. An output terminal of the OR gate is connected to the control terminal of the first switch component and the control terminal of the second switch component.

In addition, the present disclosure provides a power converter having a multi-mode switching mechanism. The power converter includes a switch circuit, an output calculating circuit and a control circuit. The switch circuit includes a first switch, a second switch and a low-side switch. A first terminal of the first switch is connected to a first terminal of an inductor. A second terminal of the inductor is connected to a first terminal of a capacitor. A second terminal of the capacitor is grounded. A node between the second terminal of the first switch and the first terminal of the capacitor is used as an output terminal of the power converter. A first terminal of the second switch is coupled to an input power source. A second terminal of the second switch is connected to a second terminal of the inductor. A first terminal of the low-side switch is connected to the first terminal of the first switch. A second terminal of the low-side switch is grounded. The output calculating circuit is configured to receive an output voltage of the power converter from the output terminal of the power converter. The output calculating circuit is configured to calculate differences between the output voltage of the power converter and a plurality of reference voltages to output a plurality of feedback calculated signals. The control circuit is connected to the input power source, a control terminal of the first switch, a control terminal of the second switch, a control terminal of the low-side switch and an output terminal of the output calculating circuit. The control circuit is configured to switch the switch circuit according to the plurality of feedback calculated signals from the input power source such that the power converter is switched between a plurality of modes.

As described above, the present disclosure provides the power converter having the multi-mode switching mechanism. The power converter of the present disclosure is able to be accurately switched between a plurality of modes (such as a boost mode, a LDO mode and a Bypass mode) for various applications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
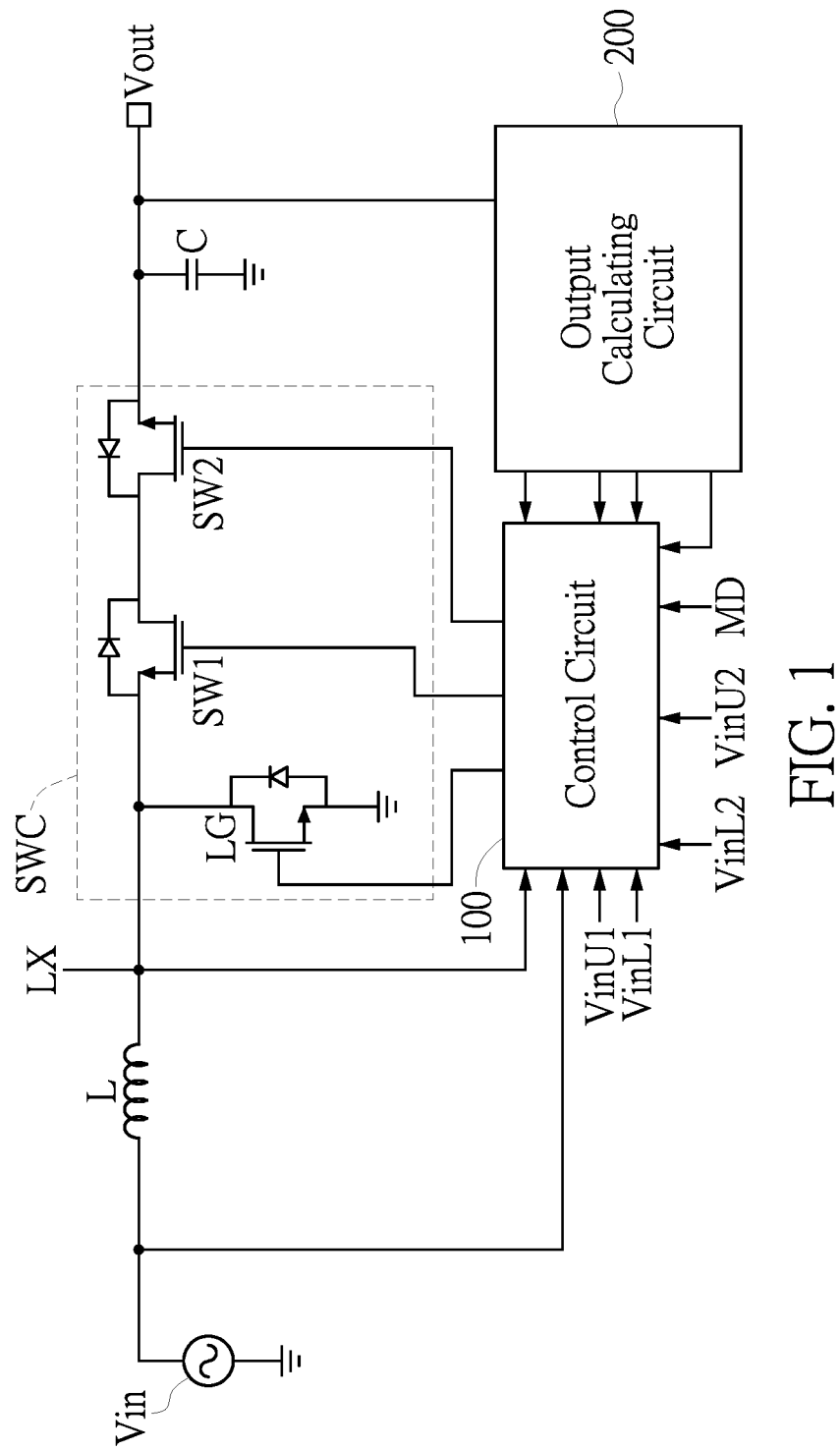
FIG. 1 is a circuit diagram of a power converter having a multi-mode switching mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter having a multi-mode switching mechanism according to a first embodiment of the present disclosure.

As shown in FIG. 1, the power converter of the first embodiment of the present disclosure includes a switch circuit SWC, a control circuit 100 and an output calculating circuit 200.

It is worth noting that, the switch circuit SWC of the power converter of the present disclosure not only includes a first switch SW1 and the second switch SW2, but also includes a low-side switch LG. Therefore, the power converter of the present disclosure is able to be switched between a plurality of modes such as, but not limited to, a low dropout (LDO) mode, a bypass mode and a boost mode.

A first terminal of the first switch SW1 is connected to a first terminal of an inductor L. A second terminal of the inductor L is connected to an input power source Vin. A first terminal of the second switch SW2 is connected to a second terminal of the first switch SW1. A second terminal of the second switch SW2 is connected to a first terminal of a capacitor C. A second terminal of the capacitor C is grounded.

A node between the second terminal of the second switch SW2 and the first terminal of the capacitor C is used as an output terminal of the power converter. A voltage of the node between the second terminal of the second switch SW2 and the first terminal of the capacitor C is an output voltage Vout of the power converter.

A first terminal of the low-side switch LG is connected to a node between the first terminal of the first switch SW1 and the first terminal of the inductor L. A second terminal of the low-side switch LG is grounded.

An input terminal of an input calculating circuit 200 is connected to the node between the second terminal of the second switch SW2 and the first terminal of the capacitor C (that is the output terminal of the power converter). An output terminal of the input calculating circuit 200 is connected to an input terminal of the control circuit 100.

An output terminal of the control circuit 100 is connected to a control terminal of the first switch SW1, a control terminal of the second switch SW2 and a control terminal of the low-side switch LG.

Further, the control circuit 100 may be connected to the input power source Vin. In addition or alternatively, the control circuit 100 may be coupled to a plurality of first power divided voltages (that are divided from the input voltage supplied by the input voltage source Vin, by different ratio), such as, but not limited to a first high-side power voltage VinU1, a first low-side power voltage VinL1, a second high-side power voltage VinU2 and a second low-side power voltage VinL2 as shown in FIG. 1. The first power divided voltages have different voltages from each other.

If necessary, the control circuit 100 may be connected to a node LX between the first terminal of the low-side switch LG and the first terminal of the inductor L.

The output calculating circuit 200 may calculate differences between a plurality of feedback divided voltages that are divided from the output voltage Vout of the power converter and a plurality of reference voltages having different voltage values to output a plurality of feedback calculated signals.

The control circuit 100 may switch the first switch SW1, the second switch SW2 and the low-side switch LG, according to the plurality of feedback calculated signals from the output calculating circuit 200 and the input voltage supplied by the input power source Vin (a voltage signal or a current signal at the node LX between the first terminal of the low-side switch LG and the first terminal of the inductor L, and a mode instruction signal MD from an external mode switching circuit). Under this condition, the power converter of the present disclosure is able to be switched between the plurality of modes.

Figure 2:
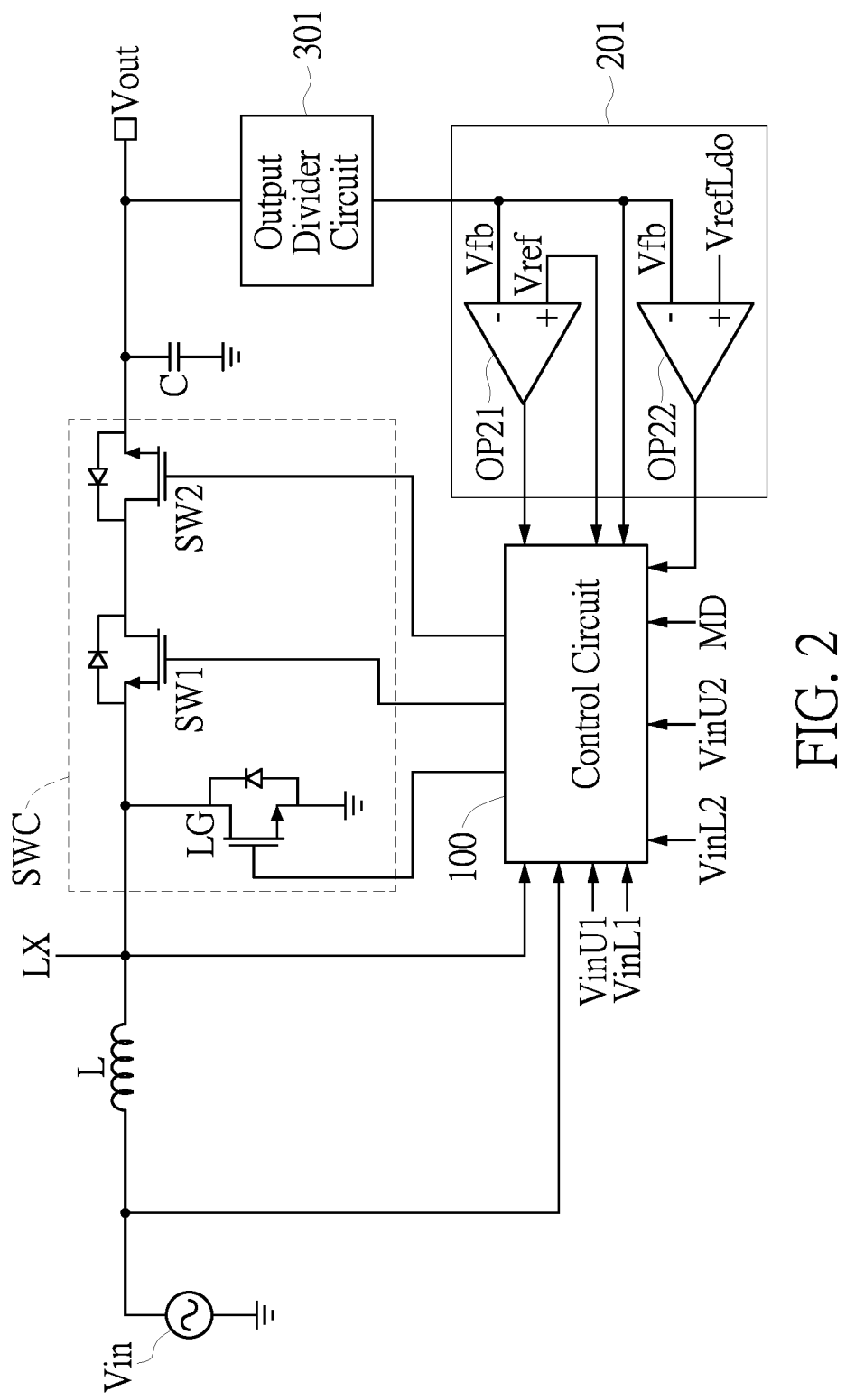
FIG. 2 is a circuit diagram of a power converter having a multi-mode switching mechanism according to a second embodiment of the present disclosure.

Reference is made to FIG. 2, which is a circuit diagram of a power converter having a multi-mode switching mechanism according to a second embodiment of the present disclosure. The same descriptions of the second and first embodiments of the present disclosure are not repeated herein.

A difference between the second and first embodiments of the present disclosure is that, the power converter of the second embodiment of the present disclosure further includes an output divider circuit 301. An output calculating circuit 201 includes a plurality of output amplifiers such as, but not limited to a first output amplifier OP21 and a second output amplifier OP22. Alternatively, the first output amplifier OP21 and the second output amplifier OP22 may be replaced with a common output amplifier in the output calculating circuit 201.

The output divider circuit 301 is connected to the node between the second terminal of the second switch SW2 and the first terminal of the capacitor C (that is, the output terminal of the power converter). The output divider circuit 301 divides the output voltage Vout of the power converter into a plurality of feedback divided voltages Vfb and outputs the plurality of feedback divided voltages Vfb.

Both of a first input terminal such as an inverting input terminal of the first output amplifier OP21 and a first input terminal such as an inverting input terminal of the second output amplifier OP22 are connected to the output divider circuit 301, and configured to receive the feedback divided voltages Vfb of the output voltage Vout of the power converter from the output divider circuit 301.

A second input terminal such as a non-inverting input terminal of the first output amplifier OP21 is coupled to a reference voltage Vref. A second input terminal such as a non-inverting input terminal of the second output amplifier OP22 is coupled to a reference voltage VrefLdo. The reference voltage VrefLdo may depend on a condition for switching the power converter to the LDO mode.

The control circuit 100 switches the switch circuit SWC according to the plurality of feedback calculated signals from the first output amplifier OP21 and the second output amplifier OP22. Under this condition, the power converter of the present disclosure is able to be switched between the plurality of modes.

Figure 3:
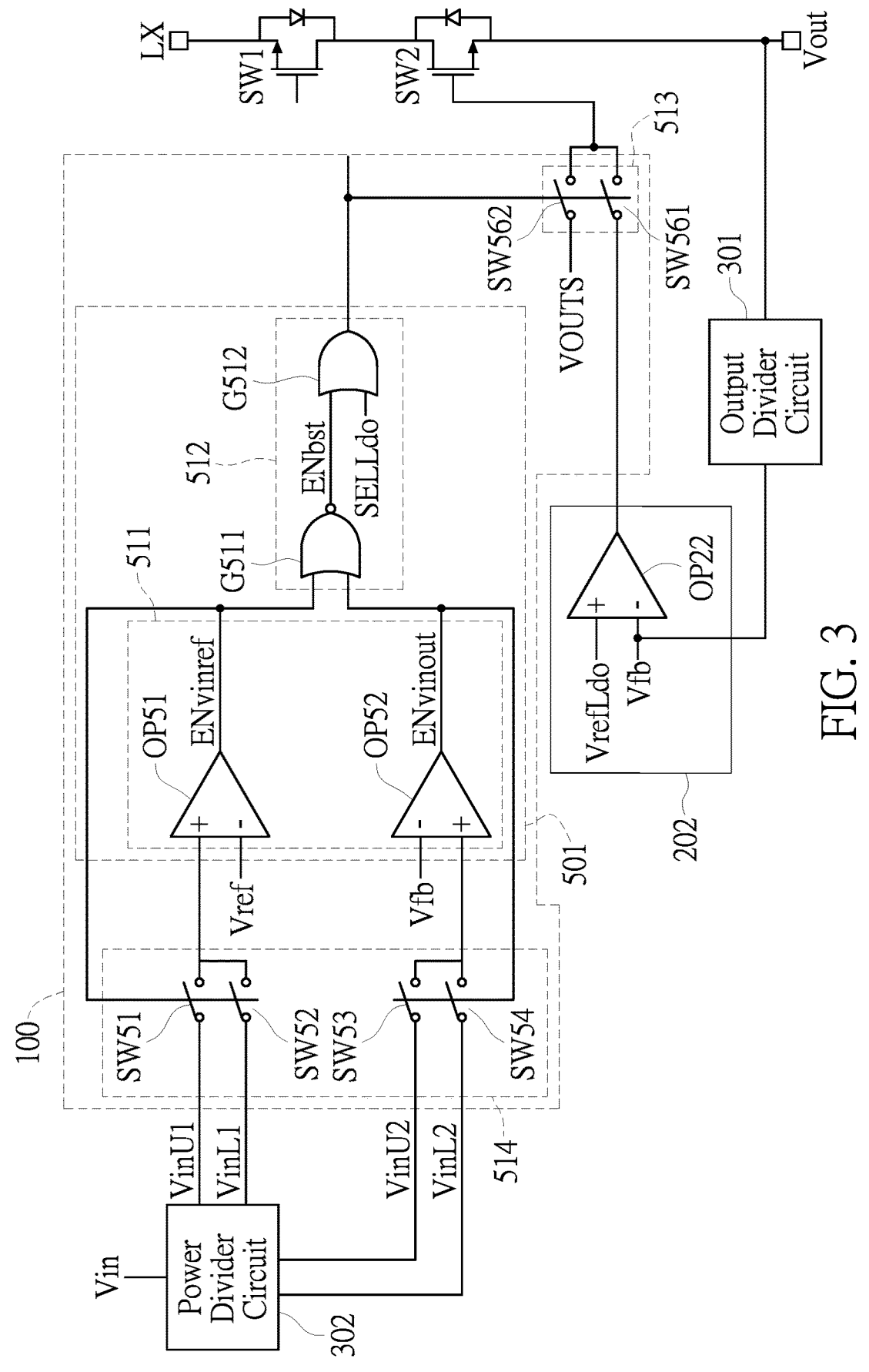
FIG. 3 is a circuit diagram of circuit components inside a control circuit of a power converter having a multi-mode switching mechanism according to a third embodiment of the present disclosure.

Reference is made to FIG. 3, which is a circuit diagram of circuit components inside a control circuit of a power converter having a multi-mode switching mechanism according to a third embodiment of the present disclosure.

The control circuit of the power converter 100 of the present disclosure (such as the control circuit 100 as shown in FIGS. 1 and 2) may include an input calculating circuit 501, a power switching circuit 514 and a switch component circuit 513 as shown in FIG. 3.

The power switching circuit 514 may include a plurality of switching components such as, but not limited to a first switching component SW51, a second switching component SW52, a third switching component SW53 and a fourth switching component SW54 as shown in FIG. 3.

The switch component circuit 513 may include a plurality of switch components such as, but not limited to a first switch component SW561 and a second switch component SW562 as shown in FIG. 3.

The input calculating circuit 501 may include an amplifier circuit 511 and a logic circuit 512.

The logic circuit 512 may include a plurality of logic gates such as, but not limited to a NOR gate G511 and an OR gate G512 as shown in FIG. 3. It should be understood that, the number and types of the logic components included in the logic circuit 512 may be determined according to actual requirements, and the present disclosure is not limited thereto.

The amplifier circuit 511 may include a plurality of input amplifiers such as, but not limited to a first input amplifier OP51 and a second input amplifier OP52 as shown in FIG. 3.

An output calculating circuit 202 may include one or more output amplifiers such as, but not limited to the second output amplifier OP22 as shown in FIG. 3.

A first terminal of the first switching component SW51, a first terminal of the second switching component SW52, a first terminal of the third switching component SW53 and a first terminal of the fourth switching component SW54 may be connected to a power divider circuit 302. The power divider circuit 302 may be connected to the input power source Vin.

A first input terminal such as a non-inverting input terminal of the first input amplifier OP51 is connected to a second terminal of the first switching component SW51 and a second terminal of the second switching component SW52. A second input terminal such as an inverting input terminal of the first input amplifier OP51 is coupled to the reference voltage Vref.

An output terminal of the first input amplifier OP51 is connected to a control terminal of the first switching component SW51 and a control terminal of the second switching component SW52.

The power divider circuit 302 may divide the input voltage supplied by the input power source Vin into the plurality of first power divided voltages having different voltage values by different ratios. For example, the plurality of first power divided voltages may include the first high-side power voltage VinU1, the first low-side power voltage VinL1, the second high-side power voltage VinU2 and the second low-side power voltage VinL2 as shown in FIG. 3, but the present disclosure is not limited thereto.

The plurality of switching components such as the first switching component SW51 and the second switching component SW52 that are included in the control circuit 100 of the power converter of the present disclosure may be alternatively turned on. As a result, the first high-side power voltage VinU1 and the first low-side power voltage VinL1 that are divided from the input voltage of the input power source Vin are alternatively inputted to the first input terminal such as the non-inverting input terminal of the first input amplifier OP51.

A first input terminal such as a non-inverting input terminal of the second input amplifier OP52 is connected to a second terminal of the third switching component SW53 and a second terminal of the fourth switching component SW54. A second input terminal such as an inverting input terminal of the second input amplifier OP52 is coupled to a divided voltage of the output voltage Vout of the power converter as the feedback divided voltages Vfb. An output terminal of the second input amplifier OP52 is connected to a control terminal of the third switching component SW53 and a control terminal of the fourth switching component SW54.

The third switching component SW53 and the fourth switching component SW54 may be alternatively turned on. As a result, the second high-side power voltage VinU2 and the second low-side power voltage VinL2 that are divided from the input voltage supplied by the input power source Vin may be alternatively inputted to the first input terminal such as the non-inverting input terminal of the second input amplifier OP52.

The first input amplifier OP51 may multiply a difference between the first high-side power voltage VinU1 or the first low-side power voltage VinL1 and the reference voltage Vref by a first gain to output an input power calculating signal ENvinref.

The second input amplifier OP52 may multiply a difference between the second high-side power voltage VinU2 or the second low-side power voltage VinL2 and the reference voltage Vref by a second gain to output a power feedback calculated signal ENvinout.

A first input terminal of the NOR gate G511 is connected to the output terminal of the first input amplifier OP51. The first input terminal of the NOR gate G511 receives the input power calculating signal ENvinref from the first input amplifier OP51.

A second input terminal of the NOR gate G511 is connected to the output terminal of the second input amplifier OP52. The second input terminal of the NOR gate G511 receives the power feedback calculated signal ENvinout from the second input amplifier OP52.

A first input terminal of the OR gate G512 is connected to an output terminal of the NOR gate G511. The first input terminal of the OR gate G512 receives a NOR gate output signal ENbst from the output terminal of the NOR gate G511. A second input terminal of the OR gate G512 is coupled to an output switching mode signal SELLdo. For example, the switching mode signal SELLdo may depend on the condition for switching the power converter to the LDO mode.

A first terminal of the first switch component SW561 is connected to an output terminal of the second output amplifier OP22 of the output calculating circuit 202.

A first terminal of the second switch component SW562 is connected to the external mode switching circuit. The first terminal of the second switch component SW562 receives an output voltage control signal VOUTS from the external mode switching circuit. The output voltage control signal VOUTS may depend on the output voltage Vout of the power converter. For example, a voltage of the output voltage control signal VOUTS is equal to a sum of the output voltage Vout of the power converter and a preset voltage.

A second terminal of the first switch component SW561 and a second terminal of the second switch component SW562 are connected to the control terminal of the second switch SW2.

A control terminal of the first switch component SW561 and a control terminal of the second switch component SW562 are connected to an output terminal of the OR gate G512 of the logic circuit 512 of the input calculating circuit 501.

The first switch component SW561 and the second switch component SW562 operate according to an input calculation logic signal from the OR gate G512 of the logic circuit 512.

When the first switch component SW561 is turned on, the output calculating circuit 202 outputs the feedback calculated signal to the control terminal of the second switch SW2 through the first switch component SW561 being turned on to control the second switch SW2.

When the second switch component SW562 is turned on, the output voltage control signal VOUTS is outputted from the external mode switching circuit to the control terminal of the second switch SW2 through the second switch component SW562 being turned on to control the second switch SW2.

Therefore, the power converter of the present disclosure is able to be switched between the plurality of modes.

Figure 4:
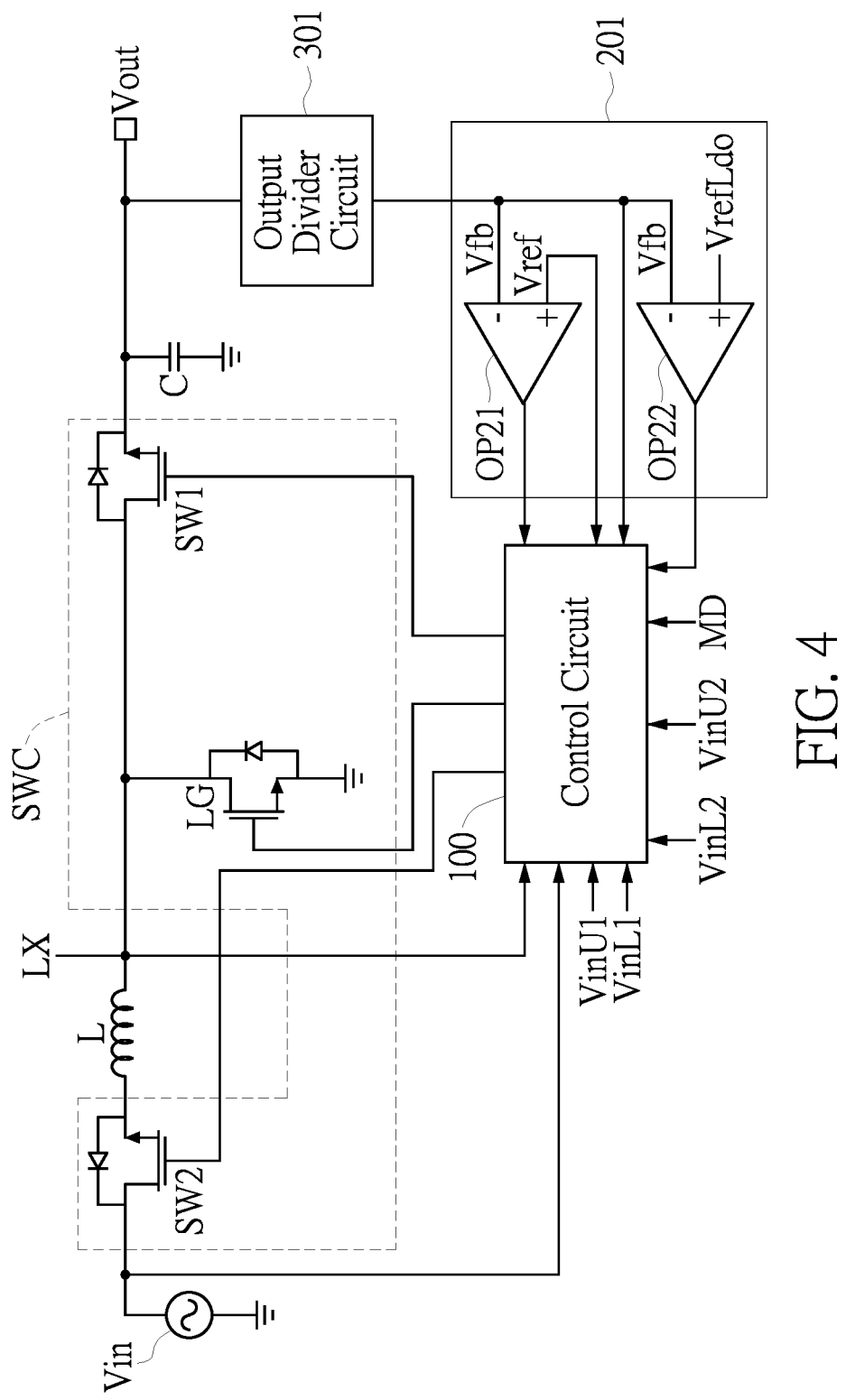
FIG. 4 is a circuit diagram of a power converter having a multi-mode switching mechanism according to a fourth embodiment of the present disclosure.

Reference is made to FIG. 4, which is a circuit diagram of a power converter having a multi-mode switching mechanism according to a fourth embodiment of the present disclosure. The same descriptions of the fourth and second embodiments are not repeated herein.

A difference between the fourth and second embodiments of the present disclosure is that, in the fourth embodiment, the first terminal of the second switch SW2 is connected to the input power source Vin and the second terminal of the second switch SW2 is connected to the second terminal of the inductor L. The first terminal of the inductor L is connected to the first terminal of the first switch SW1. The second terminal of the first switch SW1 is connected to the first terminal of the capacitor C. The second terminal of the capacitor C is grounded.

Figure 5:
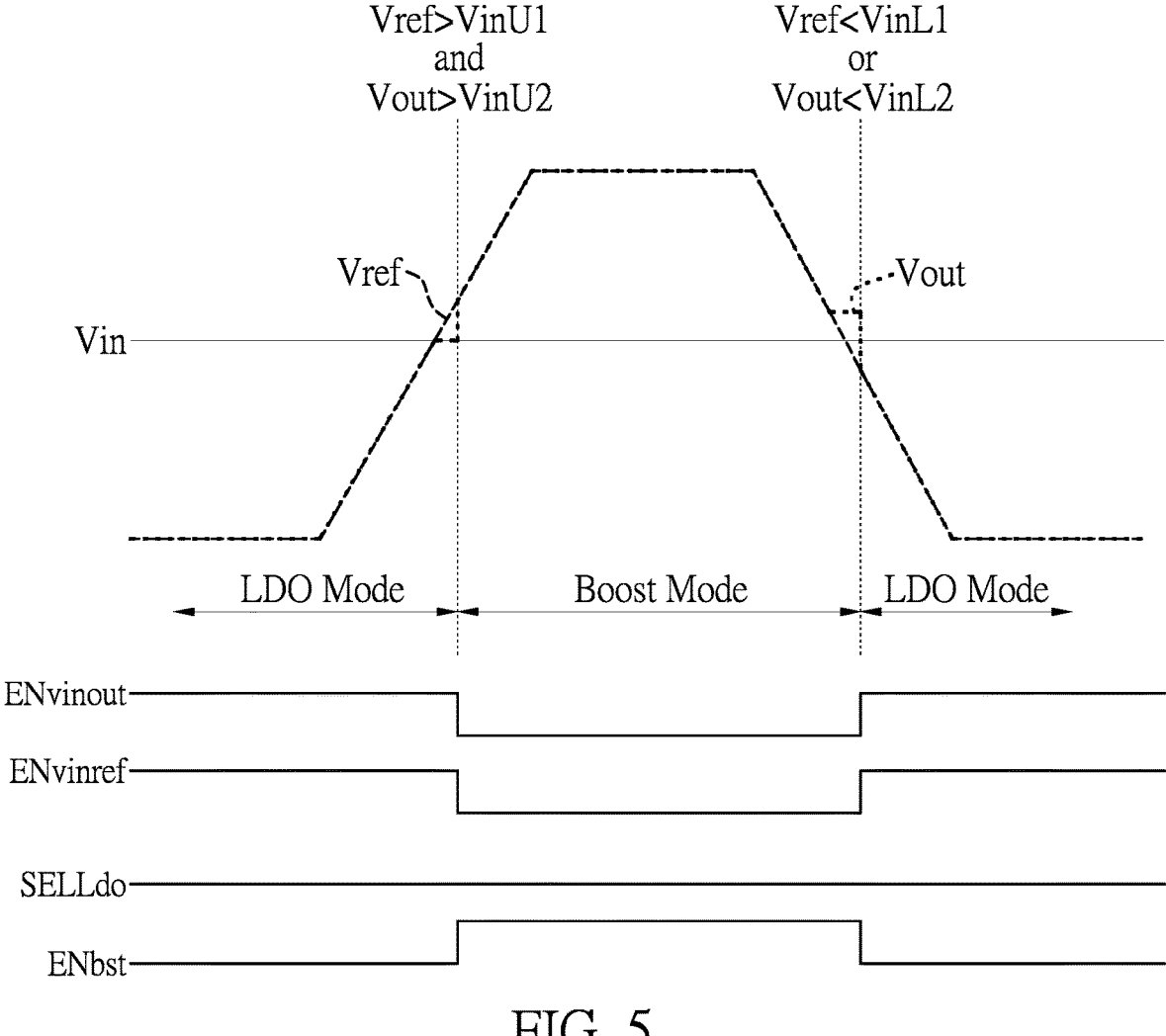
FIG. 5 is a waveform diagram of signals that are generated when a power converter having a multi-mode switching mechanism is switched between a plurality of modes according to a fifth embodiment of the present disclosure.

Reference is made to FIG. 5, which is a waveform diagram of signals that are generated when a power converter having a multi-mode switching mechanism is switched between a plurality of modes according to a fifth embodiment of the present disclosure.

The input voltage of the input power source Vin of the power converter of the present disclosure such as the power converter as shown in FIG. 3 may be modulated into the first high-side power voltage VinU1, the first low-side power voltage VinL1, the second high-side power voltage VinU2 and the second low-side power voltage VinL2 that have different voltage values.

For example, a first preset voltage is added to the divided voltage of the input voltage of the input power source Vin to generate the first high-side power voltage VinU1, and the first preset voltage is subtracted from the divided voltage of the input voltage of the input power source Vin to generate the first low-side power voltage VinL1.

For example, a second preset voltage is added to the divided voltage of the input voltage of the input power source Vin to generate the second high-side power voltage VinU2, and the second preset voltage is subtracted from the divided voltage of the input voltage of the input power source Vin to generate the second low-side power voltage VinL2.

The power converter of the present disclosure such as the power converter as shown in FIG. 3 may be switched between the LDO mode and the boost mode as shown in FIG. 5.

The second input terminal of the OR gate G512 as shown in FIG. 3 receives an output switching instruction signal SELLdo at a low level as shown in FIG. 5.

When the first high-side power voltage VinU1 received by the non-inverting input terminal of the first input amplifier OP51 is lower than the reference voltage Vref received by the inverting input terminal of the first input amplifier OP51, the input power calculating signal ENvinref outputted by the first input amplifier OP51 transits from a high level to a low level.

When the second high-side power voltage VinU2 received by the non-inverting input terminal of the second input amplifier OP52 is lower than (the feedback divided voltages Vfb of) the output voltage Vout of the power converter that is received by the inverting input terminal of the second input amplifier OP52, the power feedback calculated signal ENvinout outputted by the second input amplifier OP52 transits from a high level to a low level.

As a result, the output terminal of the OR gate G512 as shown in FIG. 3 outputs the input calculation logic signal at a high level to the control terminal of the first switch component SW561 and the control terminal of the second switch component SW562, such that the power converter is switched from the LDO mode to the boost mode.

Then, when the first low-side power voltage VinL1 received by the non-inverting input terminal of the first input amplifier OP51 is higher than the reference voltage Vref received by the inverting input terminal of the first input amplifier OP51, the first input amplifier OP51 outputs the input power calculating signal ENvinref at the high level.

When the second low-side power voltage VinL2 received by the non-inverting input terminal of the second input amplifier OP52 is higher than (the feedback divided voltages Vfb of) the output voltage Vout of the power converter that is received by the inverting input terminal of the second input amplifier OP52, the second input amplifier OP52 outputs the power feedback calculated signal ENvinout at the high level.

As a result, the output terminal of the OR gate G512 as shown in FIG. 3 outputs the input calculation logic signal at a low level to the control terminal of the first switch component SW561 and the control terminal of the second switch component SW562, such that the power converter is switched from the boost mode back to the LDO mode.

Figure 6:
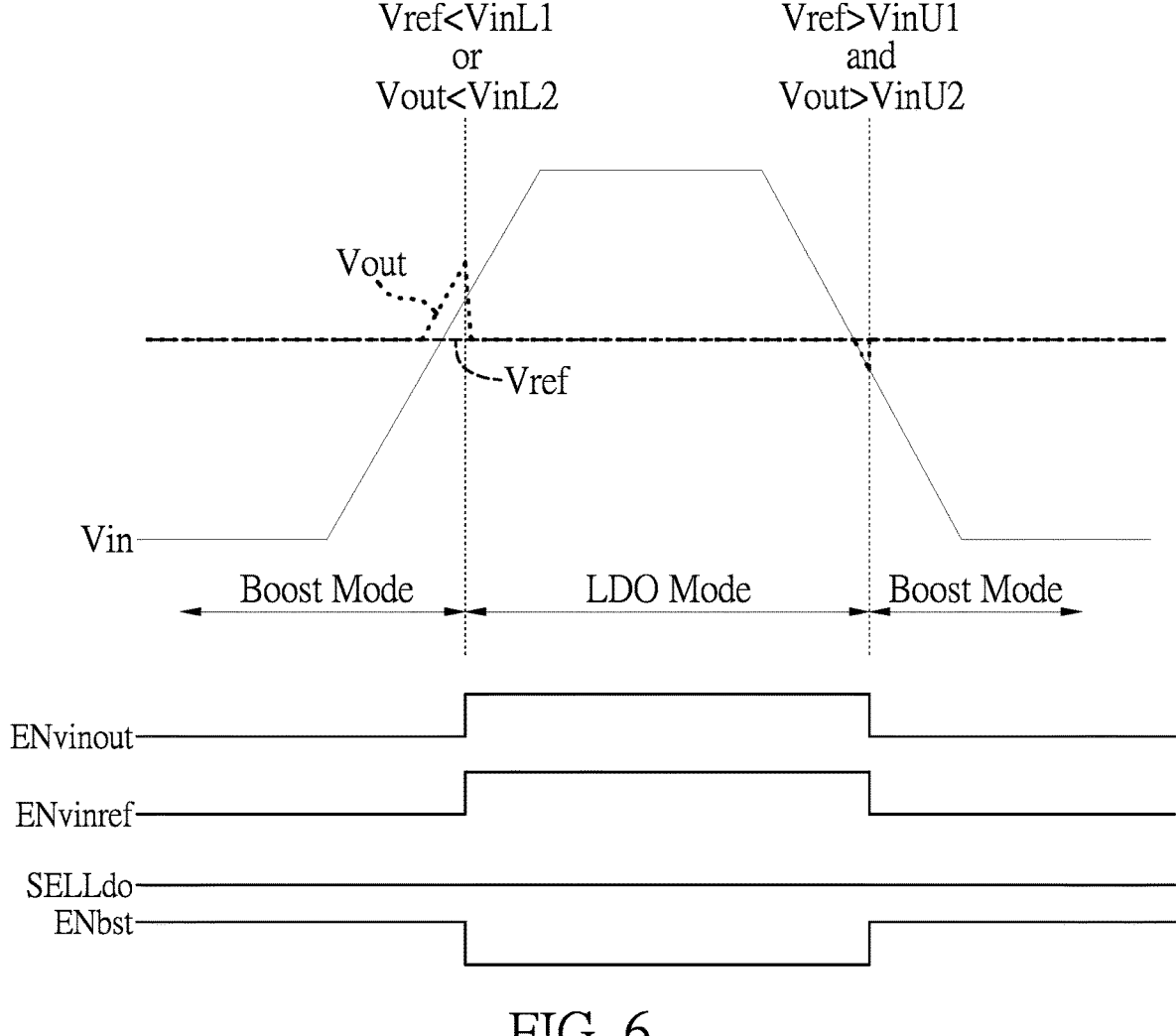
FIG. 6 is a waveform diagram of signals that are generated when a power converter having a multi-mode switching mechanism is switched between a plurality of modes according to a sixth embodiment of the present disclosure.

Reference is made to FIG. 6, which is a waveform diagram of signals that are generated when a power converter having a multi-mode switching mechanism is switched between a plurality of modes according to a sixth embodiment of the present disclosure.

The power converter of the present disclosure such as the power converter as shown in FIG. 3 may be switched between the LDO mode and the boost mode as shown in FIG. 6.

The second input terminal of the OR gate G512 as shown in FIG. 3 receives the output switching instruction signal SELLdo at the low level as shown in FIG. 6.

When the first low-side power voltage VinL1 received by the non-inverting input terminal of the first input amplifier OP51 is higher than the reference voltage Vref received by the inverting input terminal of the first input amplifier OP51, the input power calculating signal ENvinref outputted by the first input amplifier OP51 transits from the low level to the high level.

When the second low-side power voltage VinL2 received by the non-inverting input terminal of the second input amplifier OP52 is higher than (the feedback divided voltages Vfb of) the output voltage Vout of the power converter that is received by the inverting input terminal of the second input amplifier OP52, the power feedback calculated signal ENvinout outputted by the second input amplifier OP52 transits from the low level to the high level.

As a result, the output terminal of the OR gate G512 as shown in FIG. 3 outputs the input calculation logic signal at the low level to the control terminal of the first switch component SW561 and the control terminal of the second switch component SW562, such that the power converter is switched from the boost mode back to the LDO mode.

Then, when the first high-side power voltage VinU1 received by the non-inverting input terminal of the first input amplifier OP51 is lower than the reference voltage Vref received by the inverting input terminal of the first input amplifier OP51, the first input amplifier OP51 outputs the input power calculating signal ENvinref at the low level.

When the second high-side power voltage VinU2 received by the non-inverting input terminal of the second input amplifier OP52 is lower than (the feedback divided voltages Vfb of) the output voltage Vout of the power converter that is received by the inverting input terminal of the second input amplifier OP52, the second input amplifier OP52 outputs the power feedback calculated signal ENvinout at the low level.

As a result, the output terminal of the OR gate G512 as shown in FIG. 3 outputs the input calculation logic signal at the high level to the control terminal of the first switch component SW561 and the control terminal of the second switch component SW562, such that the power converter is switched from the LDO mode back to the boost mode.

Figure 7:
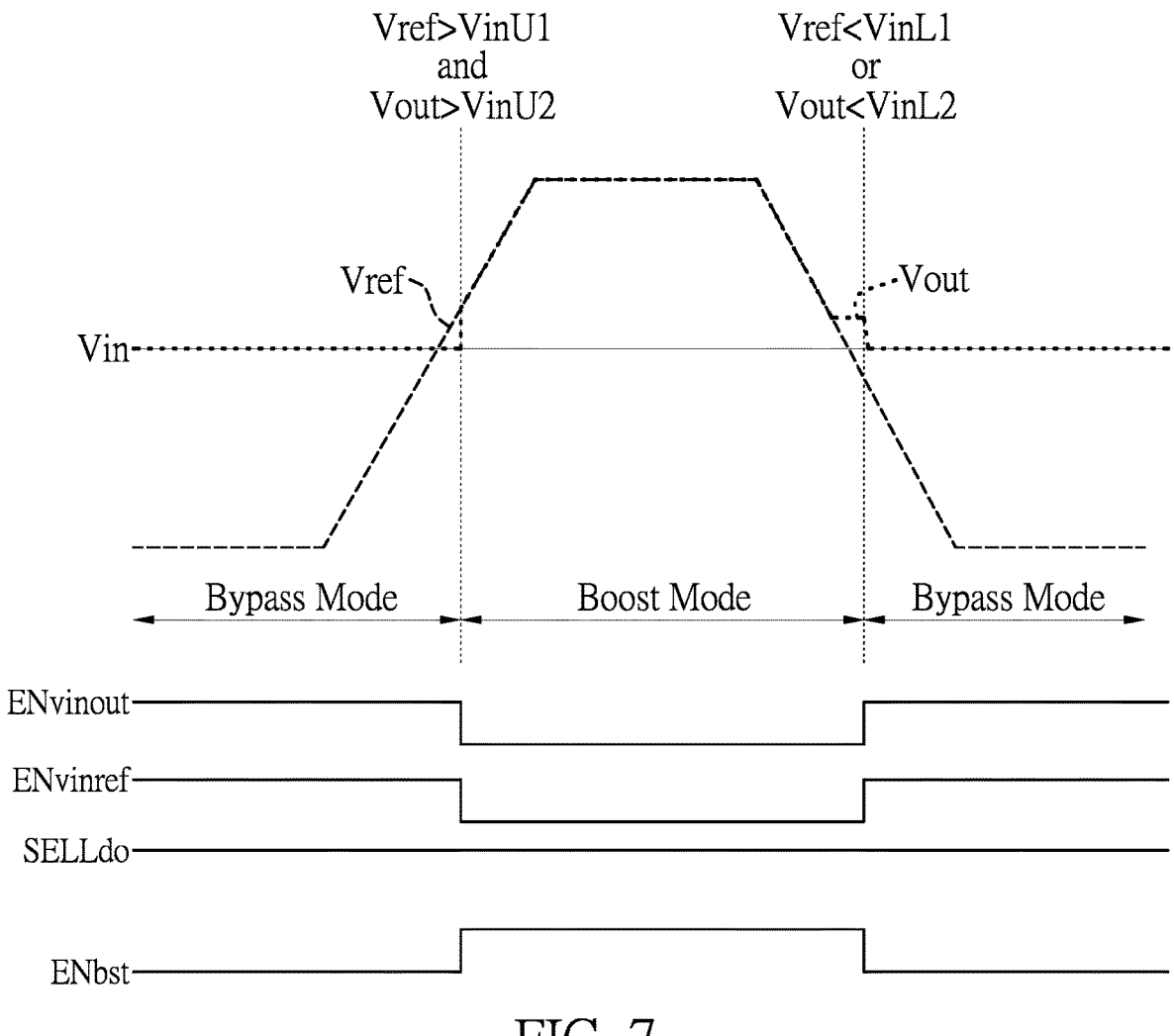
FIG. 7 is a waveform diagram of signals that are generated when a power converter having a multi-mode switching mechanism is switched between a plurality of modes according to a seventh embodiment of the present disclosure.

Reference is made to FIG. 7, which is a waveform diagram of signals that are generated when a power converter having a multi-mode switching mechanism is switched between a plurality of modes according to a seventh embodiment of the present disclosure.

The power converter of the present disclosure such as the power converter as shown in FIG. 3 may be switched between the boost mode and the Bypass mode as shown in FIG. 7.

The second input terminal of the OR gate G512 as shown in FIG. 3 receives the output switching instruction signal SELLdo at a high level as shown in FIG. 7.

When the first high-side power voltage VinU1 received by the non-inverting input terminal of the first input amplifier OP51 is lower than the reference voltage Vref received by the inverting input terminal of the first input amplifier OP51, the input power calculating signal ENvinref outputted by the first input amplifier OP51 transits from the high level to the low level.

When the second high-side power voltage VinU2 received by the non-inverting input terminal of the second input amplifier OP52 is lower than (the feedback divided voltages Vfb of) the output voltage Vout of the power converter that is received by the inverting input terminal of the second input amplifier OP52, the power feedback calculated signal ENvinout outputted by the second input amplifier OP52 transits from the high level to the low level.

As a result, the output terminal of the OR gate G512 as shown in FIG. 3 outputs the input calculation logic signal at the high level to the control terminal of the first switch component SW561 and the control terminal of the second switch component SW562, such that the power converter is switched from the Bypass mode to the boost mode.

Then, when the first low-side power voltage VinL1 received by the non-inverting input terminal of the first input amplifier OP51 is higher than the reference voltage Vref received by the inverting input terminal of the first input amplifier OP51, the first input amplifier OP51 outputs the input power calculating signal ENvinref at the high level.

When the second low-side power voltage VinL2 received by the non-inverting input terminal of the second input amplifier OP52 is higher than (the feedback divided voltages Vfb of) the output voltage Vout of the power converter that is received by the inverting input terminal of the second input amplifier OP52, the second input amplifier OP52 outputs the power feedback calculated signal ENvinout at the high level.

As a result, the output terminal of the OR gate G512 as shown in FIG. 3 outputs the input calculation logic signal at the low level to the control terminal of the first switch component SW561 and the control terminal of the second switch component SW562, such that the power converter is switched from the boost mode back to the Bypass mode.

Figure 8:
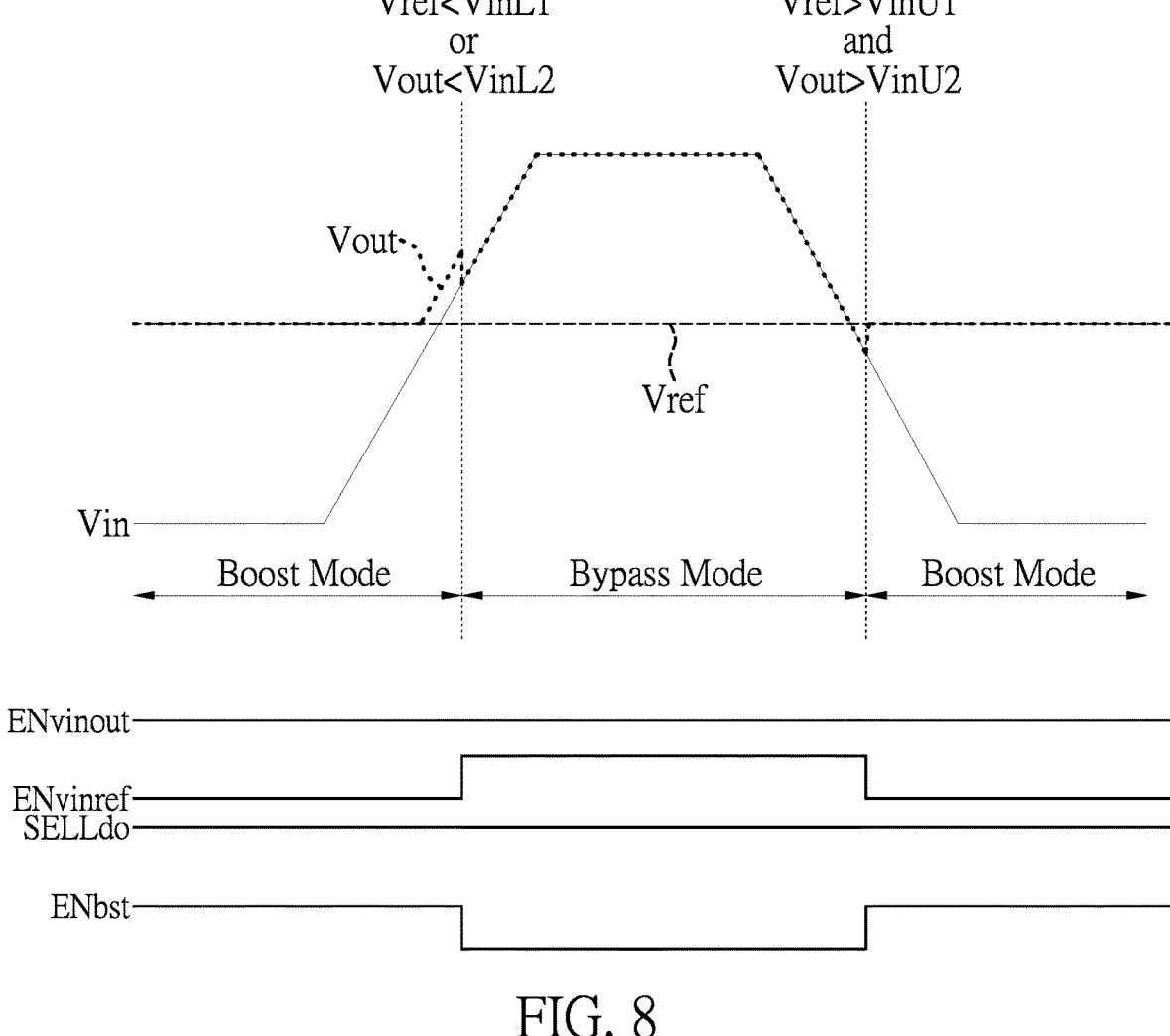
FIG. 8 is a waveform diagram of signals that are generated when a power converter having a multi-mode switching mechanism is switched between a plurality of modes according to an eighth embodiment of the present disclosure.

Reference is made to FIG. 8, which is a waveform diagram of signals that are generated when a power converter having a multi-mode switching mechanism is switched between a plurality of modes according to an eighth embodiment of the present disclosure.

The power converter of the present disclosure such as the power converter as shown in FIG. 3 may be switched between the boost mode and the Bypass mode as shown in FIG. 8.

When the first low-side power voltage VinL1 received by the non-inverting input terminal of the first input amplifier OP51 is higher than the reference voltage Vref received by the inverting input terminal of the first input amplifier OP51, the input power calculating signal ENvinref outputted by the first input amplifier OP51 transits from the low level to the high level.

When the second low-side power voltage VinL2 received by the non-inverting input terminal of the second input amplifier OP52 is higher than (the feedback divided voltages Vfb of) the output voltage Vout of the power converter that is received by the inverting input terminal of the second input amplifier OP52, the second input amplifier OP52 outputs the power feedback calculated signal ENvinout at the high level.

As a result, the output terminal of the OR gate G512 as shown in FIG. 3 outputs the input calculation logic signal at the low level to the control terminal of the first switch component SW561 and the control terminal of the second switch component SW562, such that the power converter is switched from the boost mode back to the Bypass mode.

Then, when the first high-side power voltage VinU1 received by the non-inverting input terminal of the first input amplifier OP51 is lower than the reference voltage Vref received by the inverting input terminal of the first input amplifier OP51, the first input amplifier OP51 outputs the input power calculating signal ENvinref at the low level.

When the second high-side power voltage VinU2 received by the non-inverting input terminal of the second input amplifier OP52 is lower than (the feedback divided voltages Vfb of) the output voltage Vout of the power converter that is received by the inverting input terminal of the second input amplifier OP52, the second input amplifier OP52 outputs the power feedback calculated signal ENvinout at the low level.

As a result, the output terminal of the OR gate G512 as shown in FIG. 3 outputs the input calculation logic signal at a high level to the control terminal of the first switch component SW561 and the control terminal of the second switch component SW562, such that the power converter is switched from the Bypass mode back to the boost mode.

Figure 9:
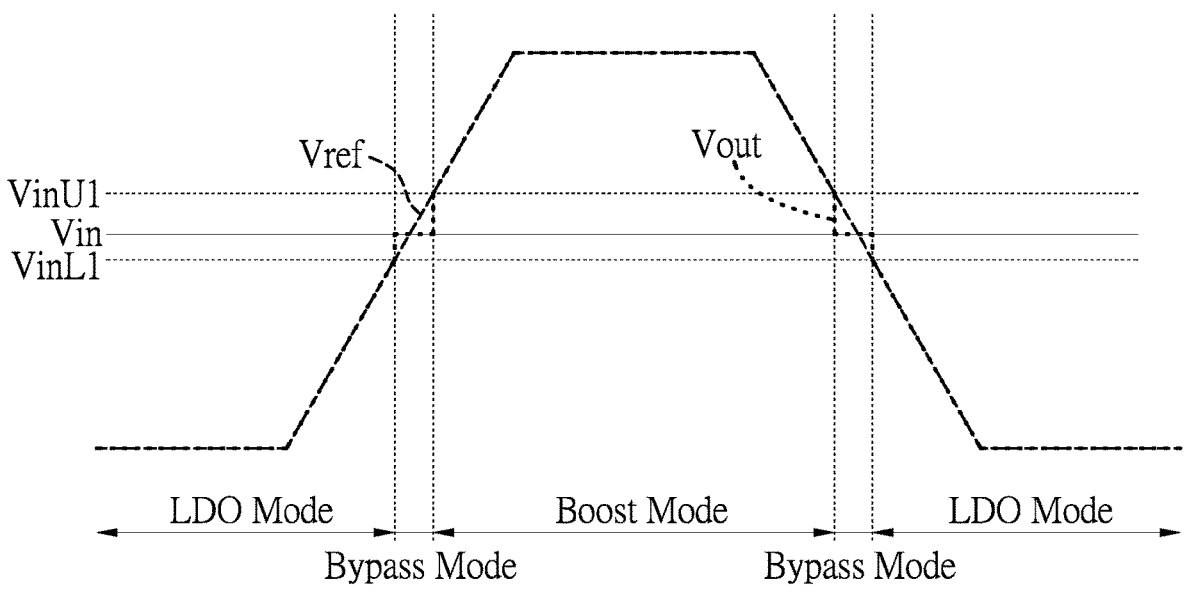
FIG. 9 is a waveform diagram of signals that are generated when a power converter having a multi-mode switching mechanism is switched between a plurality of modes according to a ninth embodiment of the present disclosure.

Reference is made to FIG. 9, which is a waveform diagram of signals that are generated when a power converter having a multi-mode switching mechanism is switched between a plurality of modes according to a ninth embodiment of the present disclosure.

The power converter of the present disclosure such as the power converter as shown in FIG. 3 may be switched between the LDO mode, the boost mode and the Bypass mode as shown in FIG. 9, during which the output voltage Vout of the power converter of the present disclosure may be adjusted to be approximately equal to the input voltage of the input power source Vin to reduce power consumption.

When the reference voltage Vref received by the inverting input terminal of the first input amplifier OP51 is lower than the first low-side power voltage VinL1 received by the non-inverting input terminal of the first input amplifier OP51, the power converter operates in the LDO mode.

Then, when the reference voltage Vref received by the inverting input terminal of the first input amplifier OP51 is higher than the first low-side power voltage VinL1 and lower than the first high-side power voltage VinU1, the power converter operates in the Bypass mode.

Then, when the reference voltage Vref received by the inverting input terminal of the first input amplifier OP51 is higher than the first high-side power voltage VinU1 received by the non-inverting input terminal of the first input amplifier OP51, the power converter operates in the boost mode.

Then, when the reference voltage Vref received by the inverting input terminal of the first input amplifier OP51 is lower than the first high-side power voltage VinU1 and higher than the first low-side power voltage VinL1, the power converter operates in the Bypass mode.

Then, when the reference voltage Vref received by the inverting input terminal of the first input amplifier OP51 is lower than the first low-side power voltage VinL1 received by the non-inverting input terminal of the first input amplifier OP51, the power converter operates in the LDO mode.

In conclusion, the present disclosure provides the power converter having the multi-mode switching mechanism. The power converter of the present disclosure is able to be accurately switched between the plurality of modes (such as the boost mode, the LDO mode and the Bypass mode) for various applications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a multi-mode switching mechanism, comprising:

a switch circuit, including:

a first switch, wherein a first terminal of the first switch is connected to a first terminal of an inductor, and a second terminal of the inductor is connected to an input power source;

a second switch, wherein a first terminal of the second switch is connected to a second terminal of the first switch, a second terminal of the second switch is connected to a first terminal of a capacitor, a second terminal of the capacitor is grounded, a node between the first terminal of the second switch and the second terminal of the first switch is used as an output terminal of the power converter; and a low-side switch, wherein a first terminal of the low-side switch is connected to the first terminal of the first switch, and a second terminal of the low-side switch is grounded;

an output calculating circuit connected to the output terminal of the power converter, wherein the output calculating circuit is configured to receive an output voltage of the power converter from the output terminal of the power converter, and configured to calculate differences between the output voltage of the power converter and a plurality of reference voltages to output a plurality of feedback calculated signals; and a control circuit connected to the input power source, a control terminal of the first switch, a control terminal of the second switch, a control terminal of the low-side switch and an output terminal of the output calculating circuit, wherein the control circuit is configured to switch the switch circuit according to the plurality of feedback calculated signals and an input voltage from the input power source such that the power converter is switched between a plurality of modes;

wherein the control circuit includes:

an input calculating circuit coupled to a plurality of first power divided voltages that are divided from the input voltage respectively by a plurality of ratios, and configured to output an input calculation logic signal according to a difference between each of the plurality of first power divided voltages and one of the plurality of reference voltages coupled to the input calculating circuit.

2. The power converter according to claim 1, further comprising:

an output divider circuit connected to the output terminal of the power converter and an input terminal of the output calculating circuit, wherein the output divider circuit divides the output voltage of the power converter to output a plurality of feedback divided voltages, and the output calculating circuit outputs the plurality of feedback calculated signals according to the plurality of feedback divided voltages and the plurality of reference voltages.

3. The power converter according to claim 2, wherein the output calculating circuit includes a plurality of output amplifiers, first input terminals of the plurality of output amplifiers are connected to the output divider circuit and configured to respectively receive the plurality of feedback divided voltages from the output divider circuit, and second input terminals of the plurality of output amplifiers are coupled to the plurality of reference voltages respectively.

4. The power converter according to claim 3, wherein the plurality of reference voltages include a first reference voltage and a second reference voltage, and the plurality of output amplifiers of the output calculating circuit include:

a first output amplifier, wherein a first input terminal of the first output amplifier is connected to the output divider circuit and configured to receive one of the plurality of feedback divided voltages from the output divider circuit, and a second input terminal of the first output amplifier is coupled to the first reference voltage; and a second output amplifier, wherein a first input terminal of the second output amplifier is connected to the output divider circuit and configured to receive another of the plurality of feedback divided voltages from the output divider circuit, and a second input terminal of the second output amplifier is coupled to the second reference voltage.

5. The power converter according to claim 1, wherein the input calculating circuit is coupled to a plurality of second power divided voltages that are divided from the input voltage respectively by different ratios, wherein the input calculating circuit is configured to output a power feedback calculated signal according to a difference between each of the plurality of second power divided voltages and a feedback divided voltage that is a voltage divided from the output voltage of the power converter.

6. The power converter according to claim 5, wherein the control circuit further includes:

a first switch component, wherein a first terminal of the first switch component is connected to the output calculating circuit and configured to receive each of the plurality of feedback calculated signals from the output calculating circuit, and a second terminal of the first switch component is connected to the control terminal of the second switch; and a second switch component, wherein a first terminal of the second switch component is connected to an external mode switching circuit and configured to receive a mode switching control signal from the external mode switching circuit, and a second terminal of the second switch component is connected to the control terminal of the second switch;

wherein a control terminal of the first switch component and a control terminal of the second switch component are connected to an output terminal of the input calculating circuit.

7. The power converter according to claim 6, wherein the input calculating circuit includes:

a first input amplifier, wherein a first input terminal of the first input amplifier is coupled to each of the plurality of first power divided voltages, and a second input terminal of the first input amplifier is coupled to one of the plurality of reference voltages;

a second input amplifier, wherein a first input terminal of the second input amplifier is coupled to each of the plurality of second power divided voltages, and a second input terminal of the second input amplifier is coupled to the feedback divided voltage that is divided from the output voltage of the power converter; and a logic circuit connected to an output terminal of the first input amplifier, an output terminal of the second input amplifier, the control terminal of the first switch component and the control terminal of the second switch component, wherein the logic circuit outputs the input calculation logic signal to the control terminal of the first switch component and the control terminal of the second switch component according to levels of the input calculation logic signal from the first input amplifier and levels of the power feedback calculated signal from the second input amplifier.

8. The power converter according to claim 7, wherein the plurality of first power divided voltages include a first high-side power voltage and a first low-side power voltage, and the control circuit further includes:

a first switching component, wherein a first terminal of the first switching component is coupled to the first high-side power voltage, a second terminal of the first switching component is connected to the first input terminal of the first input amplifier, and a control terminal of the first switching component is connected to the output terminal of the first input amplifier; and a second switching component, wherein a first terminal of the second switching component is coupled to the first low-side power voltage, a second terminal of the second switching component is connected to the first input terminal of the first input amplifier, and a control terminal of the second switching component is connected to the output terminal of the first input amplifier.

9. The power converter according to claim 8, wherein the plurality of second power divided voltages include a second high-side power voltage and a second low-side power voltage, and the control circuit further includes:

a third switching component, wherein a first terminal of the third switching component is coupled to the second high-side power voltage, a second terminal of the third switching component is connected to the first input terminal of the second input amplifier, and a control terminal of the third switching component is connected to the output terminal of the second input amplifier; and a fourth switching component, wherein a first terminal of the fourth switching component is coupled to the second low-side power voltage, a second terminal of the fourth switching component is connected to the first input terminal of the second input amplifier, and a control terminal of the fourth switching component is connected to the output terminal of the second input amplifier.

10. The power converter according to claim 9, wherein the logic circuit further includes:

a NOR gate, wherein a first input terminal of the NOR gate is connected to the output terminal of the first input amplifier, and a second input terminal of the NOR gate is connected to the output terminal of the second input amplifier; and an OR gate, wherein a first input terminal of the OR gate is connected to an output terminal of the NOR gate, a second input terminal of the OR gate is connected to the external mode switching circuit and configured to receive an output switching instruction signal from the external mode switching circuit, and an output terminal of the OR gate is connected to the control terminal of the first switch component and the control terminal of the second switch component.

\* \* \* \* \*